Jan. 16, 1962     I. HOROWITZ     3,017,198
CHILD'S PEDAL VEHICLE Filed June 15, 1959     4 Sheets-Sheet 1

INVENTOR
ISADORE HOROWITZ
BY
Strauch, Nolan & Neale
ATTORNEYS

Jan. 16, 1962     I. HOROWITZ     3,017,198
CHILD'S PEDAL VEHICLE
Filed June 15, 1959     4 Sheets-Sheet 3

INVENTOR
ISADORE HOROWITZ

BY Strauch, Nolan & Neale

ATTORNEYS

Jan. 16, 1962     I. HOROWITZ     3,017,198
CHILD'S PEDAL VEHICLE Filed June 15, 1959     4 Sheets-Sheet 4

INVENTOR.
ISADORE HOROWITZ
BY
Strauch, Nolan & Neale
ATTORNEYS

United States Patent Office 3,017,198
Patented Jan. 16, 1962

3,017,198
CHILD'S PEDAL VEHICLE
Isadore Horowitz, Shreveport, La., assignor to Universal Manufacturing Co., Inc., Bossier City, La., a corporation of Louisiana
Filed June 15, 1959, Ser. No. 820,202
14 Claims. (Cl. 280—202)

The present invention relates to vehicle structures and more particularly to a novel tubular frame, multi-wheeled pedal driven vehicle for children.

While three and four wheel pedal driven vehicles of varying construction and complexity have been known for many years, such vehicles having a capacity for transporting more than one person have been too complicated and, therefore, too expensive for marketing as a child's play vehicle. As a consequence, the generally marketed four wheel and three wheel child's play vehicles to date have been one seat or one passenger affairs of rather flimsy construction. Such vehicles, due to their flimsy construction and the lack of passenger carrying space, have appeal only to the youngest vehicle riding children and even these young children rapidly lose interest in such vehicles because of their failure to operate satisfactorily and their lack of passenger carrying space to provide companionship in travel.

It, accordingly, is the primary object of the present invention to provide a multi-wheeled child's vehicle of sturdy, lasting construction which will assure easy trouble-free operation and riding companionship yet will have appearance appeal and be marketable at a suitably low price to compete in the children's vehicle field.

Another important object of the present invention resides in the provision of a sturdy skeleton frame vehicle of pleasing appearance, easy operation and low cost enabling its marketing in the low cost, competitive children's vehicle field.

A further object of the present invention resides in providing a multi-wheel child's pedal driven vehicle with an inexpensive skeleton frame body assembly made up of a pair of one piece, tubular, side frame sections and laterally connecting front end cross-tubes, laterally connecting front and rear seats and a laterally connecting rear axle assembly.

Another object of this invention resides in providing the skeleton frame body assembly of the preceding claim with an inexpensive front steering mechanism comprising a steerable stub axle assembly respectively journalled to the front of each side frame section and each including a tie rod arm, a front end cross-tube supported steering column, a steering post journalled in the steering column and mounting at its upper end a hand grip means and at its lower end a tie rod arm and tie rod connections respectively interconnecting the stub axle tie rod arms to the steering post tie rod arm.

A further object of the present invention resides in providing an inexpensive pedal and drive sprocket assembly having a two pedal crank arm fitted at its opposite ends with respective journal bracket support plates formed to matingly adjustably cooperate with opposed longitudinally directed tubular mounting portions of a pair of respective body side frame sections.

Still further objects will appear from the following description and appended claims when read in conjunction with the accompanying drawings wherein:

With continued reference to the drawings wherein similar reference numerals are employed throughout the several views to indicate the same parts, numeral 10 generally designates a pedal vehicle made in accord with and securing the production and assembly economies and structural rigidity resulting from the present invention. Vehicle 10 is composed of a frame assembly 11 constructed and assembled in accord with this invention, a pedal assembly 12 constructed and adjustably secured to frame assembly 11 in accord with this invention, a front axle assembly 13 and steering assembly 14 constructed and operatively connected in accord with this invention, respective passenger and driver seats 15 and 16 supported by the novel unitary side frame elements of this invention and, preferably, a canopy type top 17 and support frame assembly 18 imparting to the vehicle the unique overall appearance of the well known horse drawn surrey of nineteenth century fame.

Figures 1, 2:
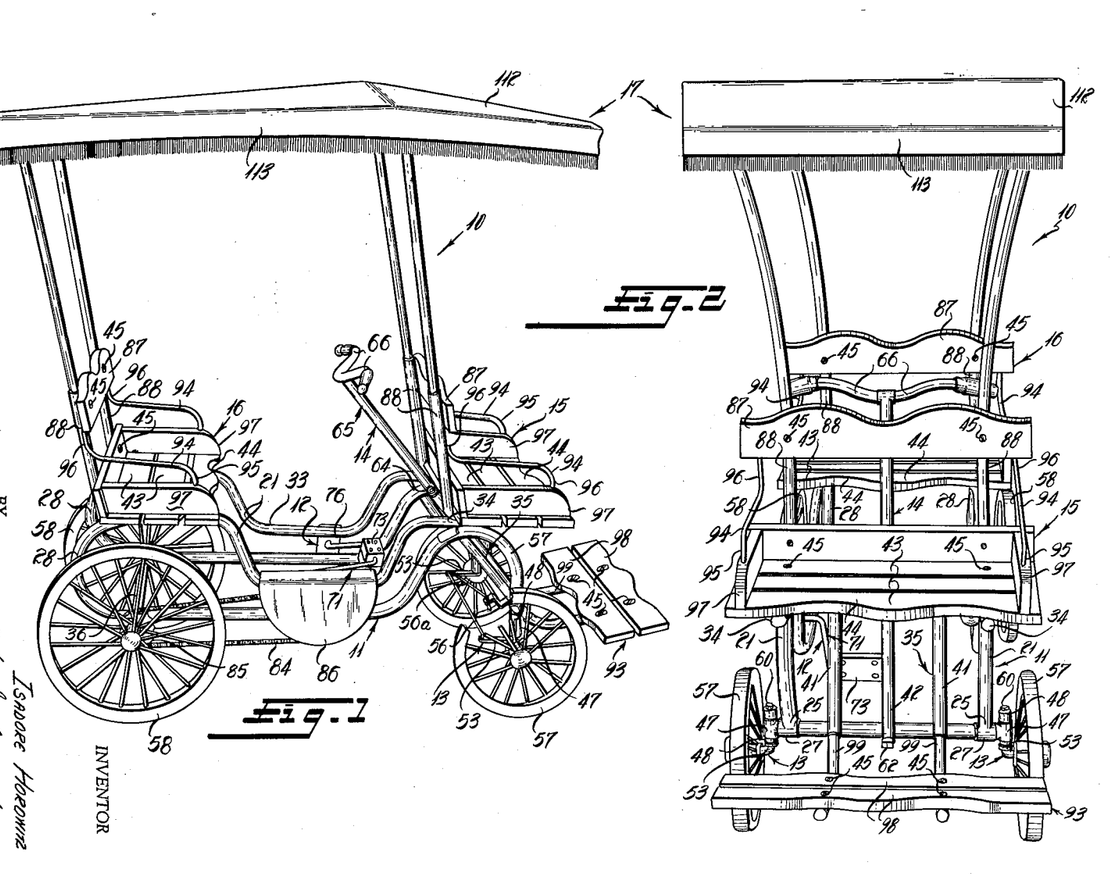
FIGURE 1 is a perspective view of a pedal vehicle embodying the present invention as viewed from the right side.
FIGURE 2 is a perspective view of the pedal vehicle of FIGURE 1 as viewed from the front.

For the sake of economy, strength and easy assembly, the frame assembly 11 of vehicle 10 is fabricated from cylindrical tube stock suitably bent and welded together to form a self reinforcing frame. To this end, respective side frame subassemblies 21 (FIGURE 4) are first produced by bending a length of straight steel, aluminum or like metal stock such as tubing 22 of suitable cross-sectional shape and dimensions at one end to form a lower element having an upstanding arched loop formation 23 at one end. The front or terminal tube end 24 of loop 23 slants slightly forwardly and downwardly to dispose its transversely notched ends 25 at a level below the plane of the main longitudinally extending body portion 26. These notched ends 25, in the final assembly of the frame 11, face generally downwardly (FIGURES 2 and 4) and have welded in their respective transverse notches laterally extending tubular coupling sockets 27. As best seen in FIGURE 2, sockets 27 are of sufficient length to merely protrude slightly from each side of tube ends 25. The opposite ends of the lower frame elements are bent upwardly and forwardly to form front facing open loops 28 the terminal ends 29 of which parallel body portion 26 and lie substantially in the plane of the uppermost run of loop 23. In performing these bending and end notching operations, the formation of the loops 23, 28 and notching of tube ends 24 is carried out under controlled manufacturing conditions such that the loops 23, 28 and notches 25 of tube ends 24 of successively produced lower frame elements are of substantially identical shape and dimensions. Thus successive lower frame elements may be selected at random for forming the respective side frame elements with assurance that opposed sockets 27, loops 23 and loops 27 of the respective laterally spaced frame elements of each frame assembly 11 can be reasonably laterally aligned in effecting the final frame assemblies 11.

The side frame elements formed from tube lengths 22 are then respectively joined by fixedly connecting the terminal end 31 (FIGURE 4) of a length of straight tubing 32 bent to provide a depressed step portion 33 in vertically spaced relation to the body portion 26 of its associated tube 22 and a longitudinally directed forwardly extending terminal end 34 abuttingly overlying the uppermost run of loop 23. Preferably the ends 29 and 32 and abutting portions of loop 23 and terminal end 34 of tube lengths 22 and 32 are respectively welded together to form unitary self reinforcing side frame subassemblies 21.

A pair of these frame subassemblies 21 are then rigidly joined together in side-by-side, laterally aligned relation by a laterally extending cross frame assembly 35 (FIGURE 4) and a stationary rear axle assembly 36 to complete frame assembly 11. In the preferred structure, assembly 36 comprises a tubular housing element welded at its opposite ends to frame assemblies 21 and an axle shaft 36a the ends of which protrude beyond the housing end to receive the wheels. As clearly seen from an inspection of FIGURE 4 cross frame assembly is composed of a main spacer tube 37 the opposite ends of which are fixedly inserted into the opposing ends to the respective coupling sockets 27 of the pair of subassemblies 21, a second spacer tube 38 provided at its opposite ends with open sided attachment sockets 39 to be fixedly secured to the upper rear runs of the loops 23 of the connected pair of subassemblies 21, a pair of laterally spaced reinforcing tubes 41 having their upper ends fixed to tube 38 through attachment sockets 39 like those previously described and their lower ends abuttingly overlying and welded to tube 37 and a steering post mounting tube 42 paralleling tubes 41 and disposed intermediate tubes 41 with its opposite ends respectively abuttingly overlying and welded to spacer tubes 37 and 38. The spacer tubes 37 and 38 optionally may be called cross-tubes or connectors. The tubes 37, 38, 41 and 42 together form a rigid, self reinforced cross frame assembly 35 which rigidly mounts associated pairs of frame subassemblies 21 in properly related spaced side-by-side relation and assures a simple, inexpensive frame assembly 11 of extreme rigidity and strength. Further reinforcement, however, is provided by rear axle 36, which comprises a solid shaft journalled in a sleeve housing fixedly welded inwardly of its opposite ends to the respective longitudinal body portions 26 of the opposite frame subassemblies 21 just forwardly of their juncture with the loop forming the front facing open loops 28, and the bolting of the seat slats 43 and 44 of seats 15 and 16 respectively to the terminal ends 29, 32 and 34 of subassemblies 21 as indicated at 45 in FIGURES 1 and 3, suitable tapped openings 46 being formed in the subframe assemblies for this purpose as shown in FIGURE 4.

Figures 4, 5, 5A:
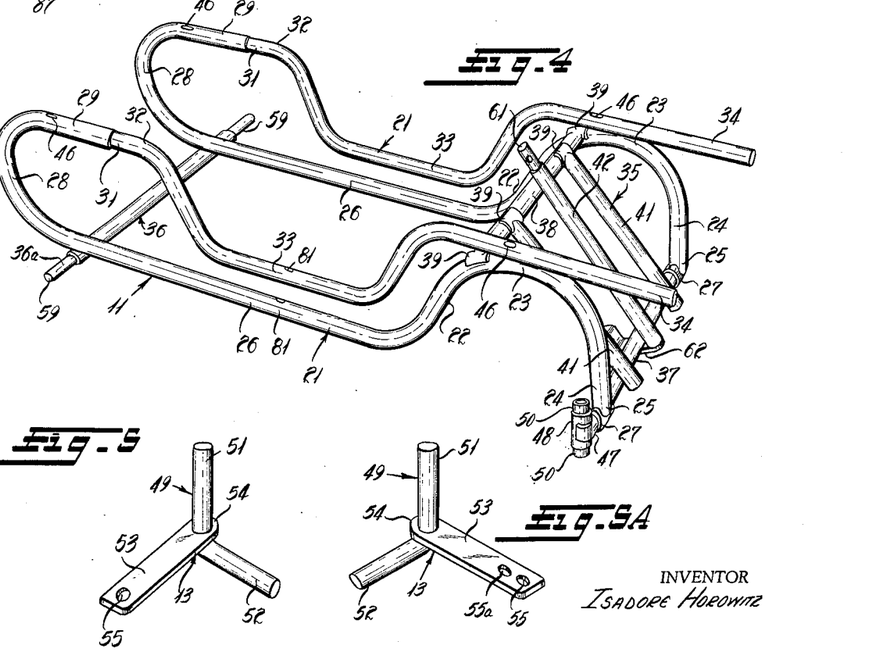
FIGURE 4 is a perspective view of the preferred frame assembly illustrating its detailed construction and manner of assembly in accord with this invention.
FIGURE 5 is a perspective view of the right front axle stub shaft assembly employed in the vehicle of FIGURES 1 through 3.
FIGURE 5A is a perspective view of the left front axle stub shaft assembly employed in the vehicle of FIGURE 1.

As best seen in FIGURES 2 and 4, the outwardly facing ends of the respective frame subassembly sockets 27 fixedly mount open sided attachment sockets 47 carrying vertically extending journal tubes 48 fitted at their opposite ends with nylon or like shouldered sleeve bearings 50 (FIGURE 4) for journalling the respective left and right hand front axle assemblies 13. These axle assemblies preferably comprise generally L-shaped rod elements 49 the opposite legs of which respectively form an upstanding stub journal post 51 and a horizontal disposed, right angularly related stub axle 52 (FIGURES 5 and 5A) and tie rod arms 53 fixed at their ends 54 to the lower ends of the respective journal posts 51 by passing the post 51 through a hole formed therein and welding the end 54 to the lower end of post 51. It is to be understood that tie rod arms 53 of the right and left hand axle assemblies extend from post 51 in opposite directions at right angles to their respective stub axles 52 to assure proper rearward disposition of the tie arms 53 as shown in FIGURE 2. The free end of each tie rod arm is provided with a circular opening 55 adapting the tie rod arm for convenient attachment to steering mechanism tie rods 56 shown in FIGURE 1. The left hand tie rod arm 53 is provided with a second opening 55a to receive the outer end of steering rod 56a. The bent ends of rods 56 and 56a are preferably secured against disassembly by locking push nuts or similar fasteners or are drilled in well known manner (not shown) to receive cotter pin retainers.

Assembly of front axle assemblies 13 is effected by inserting posts 51 upwardly into journal tubes 48 and fixing post 51 against inadvertent axial withdrawal by affixing a cap 60 (FIGURE 2) to the upper protruding post end in any suitable manner. In this connection, post 51 as herein disclosed is dimensioned to have a journalled fit in sleeve bearings 50 of journal tube 48 to insure its free journalling movement at the time of assembly. It is to be understood, however, that any other suitable combined journal and thrust bearing may be interposed between the lower end of journal tube 48 and the upper face of tie rod arm end 54 in well known manner to assure free turning movement of the respective front axle assemblies 13 when loaded.

Each of the front axle assemblies 13 and each end of rear axle shaft is fitted in any conventional manner with wheels 57 and 58 respectively suitably journalled to freely rotate with respect to their respective stub axles 52 or rear axle ends 59. Due to the difference in the horizontal disposition of stub axles 52 and rear axle ends 59, the illustrated wheels 57 and 58 are of different diameter. It is to be understood, however, that wheels of the same diameter could be used without departing from the present invention by suitable foreshortening of the length of tube ends 24 and the vertical dimension of cross frame assembly 35.

Figure 8:
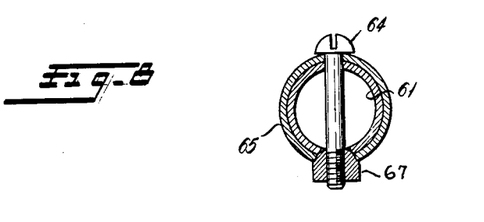
FIGURE 8 is a transverse sectional view through the telescoped connection between the steering post and steering column taken substantially on the axis of the clamp bolt and nut assembly provided to eliminate side play in the joint.

The steering assembly 14 comprises a hollow post or tube 61 (FIGURE 4) journalled in mounting tube 42 and fixedly carrying a steering arm 62 at its lower end. Arm 62, as will be clear from a consideration of FIGURES 2 and 4, extends rearwardly beneath spacer tube 37 and is provided at its rear end with a through opening 63 to receive the downwardly bent end of steering rod 56a. The opposite upper end of post 61 protrudes from the upper end of mounting tube 42 and is adapted to telescope into and be fixed by a bolt and nut assembly 64 or the like (FIGURE 1) to the lower end of a tubular column 65 fixedly mounting at its upper end oppositely extending handle bars 66 or other hand grip structure to enable an operator to rotate post 61 and its steering arm in conventional manner. Bolt and nut assembly 64 comprises a threaded, headed bolt the shank of which extends through and beyond the opposite face of post 61 and column 65, the bolt opening of which is slightly larger than that of post 61. The protruding end of the bolt receives an open ended cap nut 67 (FIGURE 8) inversely threaded onto the bolt shank so its crowned end will pass into the opening in column 65 and into the opening in post 61 to bear against and deform the surrounding material of each to tightly engage the post and column and eliminate lateral play in the telescoped joint. Axial downward disassociation movement of post 61 and arm 62 is prevented by abutting engagement of the lower end of column 65 with the upper end of mounting tube 42. If desired, combined journal and thrust bearings can be mounted on the lower end of post 61 and in the upper end of mounting tube 42 in well known manner to assure friction free journalling of the post 61 and column 65 by mounting post 42.

While propulsion of the vehicle 10 could be effected in any suitable manner, the present invention contemplates pedal propulsion or motor propulsion means. FIGURES 1 through 3 and 6 illustrate a preferred novel pedal propulsion assembly 12 for this purpose. Assembly 12 comprises a crank shaft 71 (FIGURES 3 and 6) having opposite journal ends and diametrically offset, laterally adjacent pedal stirrups 72 disposed between the opposite ends. Each stirrup 72 is provided with a relatively rotatable pedal block made up of opposed axially grooved, block segments 73 secured together by bolts, rivets or the like 74 in annular encompassing relation thereto. The journal pin like ends of shafts 71 are respectively journalled in journal bearings 75 (FIGURE 6) carried by mounting plates 76 adapted for respective removable attachment to frame subassemblies 21.

Figure 6:
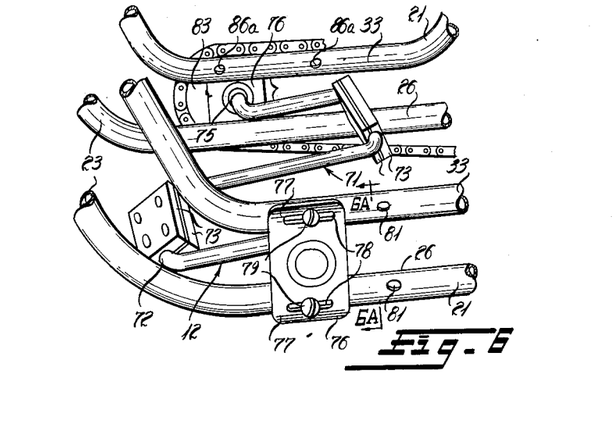
FIGURE 6 is a fragmental perspective view on a somewhat enlarged scale of pedal assembly employed in the vehicle of FIGURES 1 through 3 and its manner of attachment to the depressed runs of the opposed side frame subassemblies.
Figure 6A:
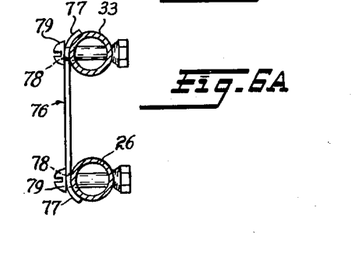
FIGURE 6A is a sectional side view taken substantially along line 6A—6A of FIGURE 6 showing the pedal shaft mounting plate.

As best shown in FIGURES 1, 6 and 6A each of the mounting plates 76 is of generally rectangular configuration with the opposite longitudinally spaced ends 77 being bent to provide open sided, laterally directed grooves to matingly abuttingly receive the respectively opposed upper and lower outer arcuate segments of the longitudinally extending body portion 26 and step portion 33 of the respective side frame subassemblies 21. Each of these grooved plate ends 77 is also laterally slotted as indicated at 78 to longitudinally slidingly cooperate with a respective clamp screw 79 threadedly associated with the plate end engaged outboard side portions of subassemblies 21 to provide for tightening of the chain. As a result of this grooved and slotted construction of plate ends 77, the pedal propulsion assembly 12 can be readily moved forwardly bodily, after it has been inserted laterally through the forwardly opening loops 28 to dispose the respective crank shaft ends and their associated plates laterally outwardly of subassemblies 21, into its proper longitudinal position relative to subassemblies 11 and secured in place by tightening of clamp screws 79. Since the lateral grooves of plate end 77 engage opposing arcuate surfaces of the parallel vertically related runs of frame body portions 26 and frame step portion 33 and clamp screws 79 retain these mounting plates against lateral outward disengaging movement away from the respective frame subassemblies, it will be appreciated that turning movement of mounting plates 76 is effectively prevented. Also the slots 78 provide several inches of relative longitudinal adjustment of the entire pedal assembly 13 with respect to the frame assembly 11 and the operator's seat 16 fixed to frame assembly 11 so long as suitable shortening or lengthening of the chain is effected by removal or insertion of links. As a consequence, the longitudinal positioning of the pedal assembly can be adjusted within limits forwardly or rearwardly along the frame to a position most comfortable to a particular operator. Additional tapped openings 81 may be provided along the frame runs 26 and 33 to provide a major adjustment of the pedal assembly 13 should this be necessary.

Figure 3:
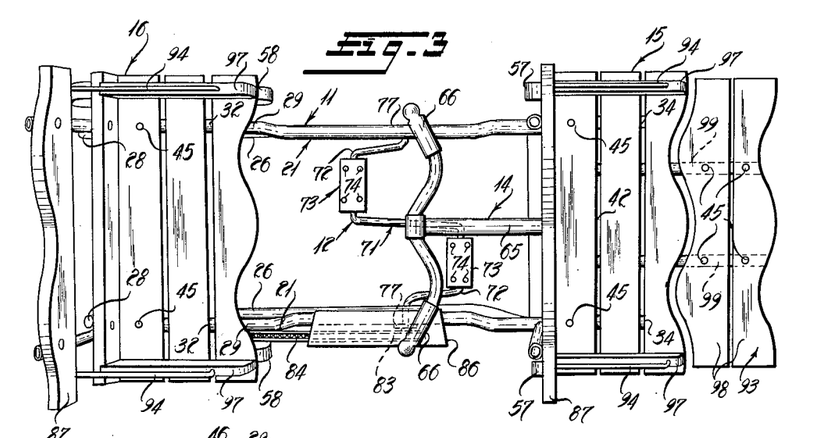
FIGURE 3 is a top plan view of the vehicle of FIGURE 1 with the canopy top and its support frame removed for clarity of illustration of the general seat and pedal arrangement.

As most clearly appears from an inspection of FIGURES 1, 3 and 6, one end of crank shaft 71 is extended beyond its mounting plate 76 and nonrotatably mounts a drive sprocket wheel 83 of a chain and sprocket drive means. Sprocket wheel 83 drivingly cooperates with a sprocket chain 84 which extends rearwardly to engage a driven sprocket wheel 85 fixedly secured to the hub of the adjacent rear wheel 58, the right rear wheel as shown in the drawings. A sprocket wheel guard 86 is preferably provided to house the sprocket wheel 83 and is secured to the inner run of depressed frame portion 33 by self tapping screws entered into drilled openings 86a (FIGURE 6).

Referring for the moment to FIGURES 1 through 3 and 7, it will be noted that seat units 15 and 16 each have rearwardly inclined back rests 87 fixed to upstanding tubular posts 88 the lower ends of which are flattened out and bent forwardly as indicated at 89 (FIGURE 7) to form attachment pads. Each attachment pad 89 is adapted to be abuttingly rested on a frame tube terminal end 29 or 34 beneath the rearmost seat slat 43 and is drilled as indicated at 91 (FIGURE 7) to receive the securing screw 45 employed to attach the seat units in place on frame assemblies 21. Suitable tapped openings 46 (FIGURE 7) are also formed in posts 88 to receive attachment screws for securing the respective slats of the seat back rest 87 to posts 88.

The passenger seat 15 being disposed above the front wheels 47 and at the extreme front of the vehicle places the occupant in a position of possible danger in event of front end collisions. To afford the occupant a reasonable amount of protection, the present invention contemplates a combined foot rest and bumper 93 and seat side arms or hand grips 94. Similar side arms are also provided for driver seat 16. These side arms comprise metal rod stock having their opposite ends bent respectively downwardly and upwardly as indicated at 95 and 96 to be press fitted into suitable openings drilled respectively in seat side boards 97 and back rest slats 87. Combined foot rest and bumper 93 comprises slats 98 secured by screws 45 to a pair of generally L-shaped, forwardly extending, tubular support elements 99 inserted into and welded to the lower ends of reinforcing tubes 41 of cross frame assembly 35.

Figure 7:
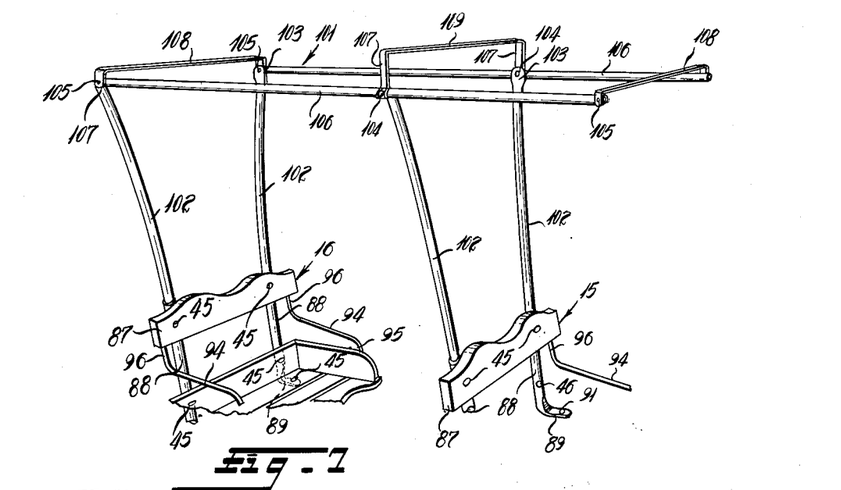
FIGURE 7 is a perspective view of the canopy top support frame of FIGURES 1 and 2 and its mounting posts.

While the vehicle so far described provides a wholly usable vehicle, greater appeal to the juvenile users for whom the present vehicle is primarily intended is afforded by the removable surrey type canopy top 17 illustrated in FIGURES 1, 2 and 7. This canopy top comprises a framework 101 (FIGURE 7) made up of two pairs of upstanding laterally bowed support posts 102 the lower ends of which are formed to snugly telescope into the upper ends of seat back support posts 88 until they abut the securing screws 45 employed to secure seat back slat 87 in place. The upper ends of posts 102 are flattened out as shown at 103 (FIGURE 7) and drilled to freely receive securing screws 104 and 105 provided to mount the longitudinally extending, tubular canopy frame elements 106. Screws 104 and 105 pass freely through the frame elements 106 and threadedly engage suitable tapped openings (not shown) in the right angularly bent ears 107 of flat metal strap elements 108 and 109 respectively extending laterally between posts 102 of frame 101. A similar metal strap 108 is secured by screws 105 to the front end of frame elements 106. Preferably the lateral dimension of frame 101 substantially exceeds the lateral dimension of the vehicle seats and the longitudinal dimension sufficiently exceeds the length of the vehicle to assure an overhang forwardly and rearwardly of the seats 15 and 16. As a consequence, the awning canvas canopy 112 with its depending fringed side and end skirts 113 when drawn over the frame 101 and secured to the frame by buckled loops or other means (not shown) will effectively shield the vehicle occupants from the direct sun rays and light rain. In order that a reasonably tight connection will be assured between posts 88 and 102, the lateral spacing of the lower ends of posts 102, when freely depending from frame 101, is preferably slightly greater than the lateral spacing of the upper ends of posts 88. As a consequence, assembly is best effected by pressing the lower ends of opposite posts 102 laterally inwardly and inserting them in their respective posts 88. When assembled the canopy frame 101 will be slightly stressed in a manner to cause the lower ends of posts 102 to be yieldingly biased laterally outwardly with respect to posts 88 to frictionally bind posts 102 in telescoped assembled relation.

Figure 9:
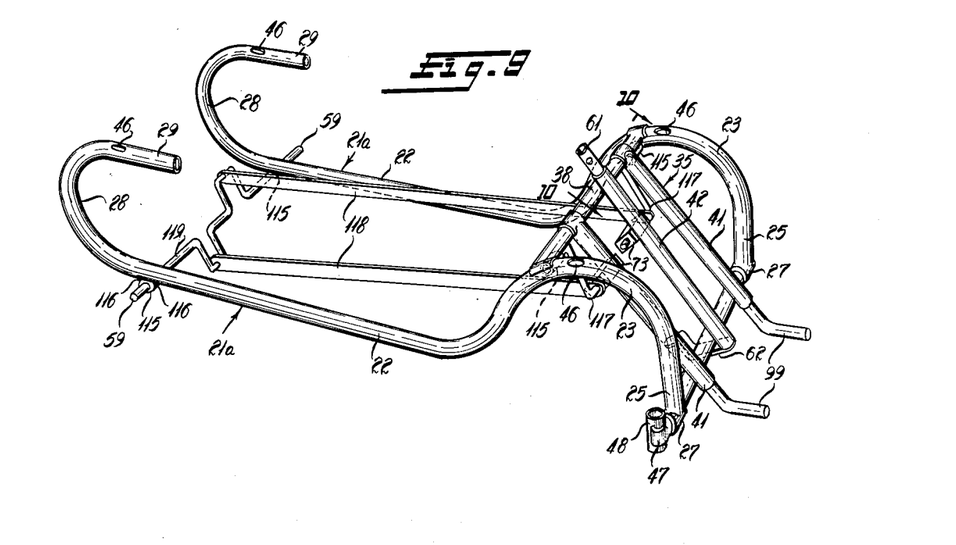
FIGURE 9 is a view similar to FIGURE 4 illustrating an alternate frame construction and pedal mechanism of somewhat lesser expense that may be used preferably in smaller sized vehicles for the toddler trade where the superior strength of the preferred frame structure and chain drive mechanism is not required.
Figure 10:
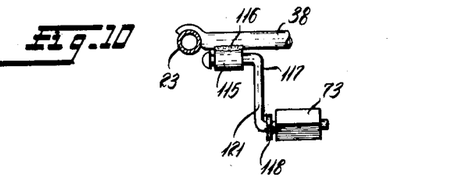
FIGURE 10 is a fragmental sectional view taken on line 10—10 of FIGURE 9 illustrating the pedal hanger employed in the alternate frame construction.

An alternate less expensive frame and pedal construction is illustrated in FIGURES 9 and 10. As clearly appears from a comparison of FIGURES 4 and 10, the respective side frame assemblies 21a of this alternate form of the invention are formed by tubing 22 of the former construction only joined at their forward ends by cross frame assembly 35 previously described. The front seat attachment openings 46 in this form of the invention are formed directly in the upper face of tube loop 23.

In lieu of the pedal propulsion chain and sprocket drive of the preferred embodiment, the present form of the invention embodies a simple push-pull bar type pedal propulsion assembly composed of pedal hanger sleeves 115 axially paralleling and welded at 116 (FIGURE 10) to the underside of cross spacer tube 38 at laterally spaced points adjacent frame units 21a, generally Z-shaped pedal crank arms 117 each having an arm journalled in a respective hanger sleeve and a second arm journalling a pedal block 73 of any suitable form and a respective push-pull bar or strap 118 drilled at opposite ends to respectively loosely encompass the second arm of one of the pedal crank arms 117 and a double crank arm rear axle 119 adapted through pin or key means (not shown) to fixedly mount rear drive wheels on its opposite ends. As best seen in FIGURE 10, the forward ends of push rods 118 are confined between the inner end face of the respective pedal blocks 73 and the connector run 121 of the pedal crank arms 117. The opposite ends of the double crank arm rear axle 119 are respectively journalled inwardly from their wheel supporting ends 59 in segmental hanger sleeves 115 like those heretofore described welded as at 116 in lateral coaxial relationship to the under face of the respective frame tubes 22 substantially at the point of tangency of loop 28 and the main longitudinally extending body portion 26 of tubes 22.

It will be appreciated that the alternate frame and pedal structure effects both a material and labor saving due to elimination in its entirety of the frame tubing 32 of the preferred embodiment and the full length axle housing tube of the axle assembly 36 of the preferred embodiment. Such omission of material at these points, while reducing somewhat the overall strength of the vehicle frame, is of no practical importance in producing a smaller size toddler vehicle since adequate strength is retained for the weight of the occupants and the usage contemplated.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be covered by United States Letters Patent is:

1. A play vehicle comprising a pair of laterally opposed tubular side frames each composed of a length of metal tubing bent upon itself to form a frame subassembly having generally longitudinal tubular runs extending between respective upwardly arched end formations one of which is formed with its terminal end section extending vertically downward; respective steerable stub axles journalled on the terminal ends of each of said vertical downwardly extending terminal end sections and including a tie rod arm; a rear axle assembly connected adjacent its oppositely extending wheel supporting terminal ends to the respective tubular side frames at a point longitudinally remote from said one arched end formation and including drive wheels; a cross-tube fixedly secured at its opposite ends to the respective tubular side frames at a point adjacent the upper rearmost portion of its one arched end formation; a second cross-tube fixedly secured at its opposite ends to the respective lower terminal ends of said vertically downwardly extending terminal end sections; propulsion means fixedly journalled in laterally extending relation between said respective tubular side frames; a generally vertically extending tubular column fixedly secured to the midpoints of said respective cross-tubes; a steering post journalled in said tubular column and having a steering arm at its lower end and a hand grip at its other end; tie rod means interconnecting said steering arm of said steering post and said tie rod arms of said respective steerable stub axles thereby adapting said steerable stub axles for steering movement upon rotation of said steering post; respective wheels rotatably mounted on said steerable stub axles; drive means interconnecting said propulsion means and said rear axle assembly; and seat means extending laterally between the other upwardly arched end formations of said side frame sections to provide a seat for the vehicle operator.

2. The play vehicle of claim 1 wherein the other terminal end section of each of said one piece frame sections extends forwardly at right angles to its respective one terminal end section and a second seat means extends laterally between said other terminal end sections to provide a passenger seat.

3. The play vehicle of claim 1 wherein said propulsion means comprises a pedal assembly including end journal plates providing clamp bolt receiving slots extending laterally between the side edges of said journal plates adapting said pedal assembly for limited relative fore and aft adjustment relative to said frame subassemblies and said operator's seat.

4. The play vehicle of claim 1 wherein said drive means comprises a chain and sprocket assembly including a driving sprocket wheel fixed to said propulsion means adjacent but outwardly of one of said frame subassemblies; a driven sprocket wheel fixed to the hub of the wheel supported by said rear axle assembly rearwardly of said driving sprocket wheel; and an endless sprocket chain operatively drivingly engaging said driving and driven sprocket wheels.

5. The play vehicle of claim 1 wherein said propulsion means comprises a pedal assembly including a pair of segmental hanger sleeves respectively welded to said first mentioned cross-tube inwardly of its opposite ends, respective generally Z-shaped pedal crank arms having one leg journalled in each of said hanger sleeves and a respective pedal block journalled on the other leg of each pedal crank arm; and said drive means comprises respective push-pull bars journalled at one end on each of said other crank arm legs adjacent a respective pedal block and having an opposite end formed to journallingly receive a respective crank arm segment of a rear drive axle and a double crank arm of said rear axle assembly journalled in laterally extending relation between said laterally opposed tubular side frames.

6. A pedal assembly for a four wheel pedal driven vehicle having opposite tubular side frames including respective oppositely related pairs of parallel tubular runs comprising a two pedal crank shaft having its opposite ends formed into journal pins, a drive sprocket wheel fixed to said crank shaft inwardly from one of its journal pin ends; and respective journal plates for said opposite crank shaft ends comprising elongated body portions the opposite ends of which are shaped to provide upper and lower laterally extending grooves for matingly receiving the outwardly facing portions of said respective pairs of parallel tubular runs, the centers of which mount journal bearings for receiving the opposite crank shaft ends and limiting axial shifting of said crank shaft with respect to said journal plates and the grooves of which are longitudinally slotted to form clamp bolt adjustment slots permitting limited relative adjustment of said pedal assembly relative to said vehicle side frames.

7. A steering mechanism for a four wheel pedal driven vehicle having laterally spaced, skeleton-like side frame sections having upper and lower side frame cross-tubes extending laterally between said side frame sections at one end and tubular vertically extending side frame section supported front end axle sockets individual to each side frame section secured to the lower side frame cross-tube; respective stub axle assemblies individual to each axle socket and each comprising first and second right angularly related spindle portions respectively adapted to be received in said axle sockets and to journal the respective front vehicle wheels and respective tie rod arms fixedly secured to said first spindle portion; a steering column fixedly supported by said upper and lower side frame cross-tubes in generally vertically rearwardly inclined relation between the front ends of said side frame sections with its lower end terminating substantially in the plane of said respective stub axle assembly tie rod arms; a steering post journalled in said steering column with its opposite ends protruding beyond the opposite ends of said steering column; a tie rod arm fixed to the lower protruding end of said steering post; rod means interconnecting said stub axle rod arms to said steering post tie rod arm; and a hand grip steering arm having a hub portion connected to the upper protruding end of said steering post.

8. A child's vehicle comprising a tubular fabricated skeleton frame made up of a pair of self reinforcing, skeletal side frame subassemblies and a connecting and rigidifying cross frame assembly rigidly interconnecting the side frame subassemblies at one end to form a longitudinally and laterally rigid frame assembly, said respective side frame subassemblies having upper and lower tubular runs the upper runs of which are depressed intermediate their ends to dispose their upper and lower intermediate runs in closely vertically spaced parallel relation between opposite end runs having a substantially greater vertical spacing; laterally extending seats fixedly connected to the upper runs of the laterally opposed side frame subassembly end runs; respective steerable wheel assemblies mounted at said one end of each side frame subassembly; steering mechanism mounted on said cross frame assembly and having hand grip means disposed in operative juxtaposition to one of said seats; means connecting each of said steerable wheel assemblies to said steering mechanism whereby steering of said vehicle may be effected by an operator occupying said one seat; rear axle means fixedly connected to the other end of said side frame subassemblies; supporting wheel means journalled on said rear axle means; drive means longitudinally adjustably fixed to said upper and lower intermediate runs of said opposed side frame subassemblies in operative juxtaposition to said one seat and said steering mechanism; and drive transfer means interconnecting said drive means and said rear axle journalled wheel means.

9. The vehicle of claim 8 wherein said drive means comprises a dual pedal crankshaft having its opposite ends formed into journal pins; respective mounting plates carried by said crank shaft ends and journalling said ends in said plates, said plates along opposite edges being grooved in generally parallel relation to respectively matingly encompass opposing portion of said upper and lower intermediate runs of a respective side frame subassembly to non-rotatably fix said mounting plates to said respective side frame subassemblies; and securing means cooperating with said respective mounting plates and the related intermediate runs of said respective side frame subassemblies to fix said mounting plates in a predetermined position longitudinally of said intermediate runs.

10. The vehicle of claim 8 wherein said steerable wheel assemblies comprise a combined journal pin and wheel stub axle having integral right angularly related pin and shaft portions, a wheel journalled on said shaft portion and a tie rod arm fixed intermediate said pin and shaft portions for operative connection to said means connecting said steerable wheel assemblies and said steering mechanism.

11. A wheeled play vehicle comprising a pair of laterally opposed tubular side frames each composed of a length of metal tubing bent upon itself to form a frame subassembly having generally longitudinal runs extending between respective upwardly arched, forwardly and rearwardly disposed formations forming seat and canopy frame supports and respective front vertically downwardly extending terminal end portions; a cross-tube fixedly secured at its opposite ends to the respective tubular side frames at a point adjacent the upper rearmost portion of the forwardly disposed arched end formation; a second cross-tube fixedly secured at its opposite ends to the respective lower terminal ends of said vertically downwardly extending terminal end portions; respective upstanding seat back and canopy frame support posts secured to each of said seat and canopy frame supports each having frame connectors at their upper ends; laterally spanning seat assemblies fixed to laterally opposed pairs of said seat and canopy frame supports and their related seat back and canopy frame support posts; a canopy frame fixed to each support post frame connector and having a forward extension arranged to overhang the forwardly disposed seat assembly; a fringed canopy cover secured to and enclosing said canopy frame; front steering wheels and rear drive wheels supportingly secured to said tubular frame subassemblies; and occupant actuated propulsion and steering means disposed between said side frames and said seat assemblies beneath and protected by said canopy cover whereby a covered play vehicle is assured.

12. The play vehicle of claim 11 wherein each of said seat back and canopy frame support posts depends below its associated seat and has its extreme end portion bent forwardly at right angles and fixed to its associated frame subassembly and a foot board is provided extending laterally of the forward end of the vehicle to form a passenger foot rest.

13. A unitary tubular side frame section to form a frame for a four wheel pedal driven vehicle comprising a length of tubing bent adjacent one end to form a first arch, one side of said arch having its terminal tube end as its lowermost extremity and the other side of said arch at its lower end merging through a bend into a first longitudinal run lying in the plane of said first arch and having a second longitudinal run paralleling said first longitudinal run, said second longitudinal run defining with the crown of said first arch of self-reinforcing frame section wherein said one terminal tube end provides a steerable axle support, said first arch and said second longitudinal run respectively form front and rear seat supports, and the rearmost portion of said first longitudinal run forms a rear axle assembly support.

14. A unitary tubular side frame section adapted for use with a similar side frame section to form a frame for a four wheel pedal driven vehicle comprising a length of tubing bent adjacent one end to form a first arch, one side of said arch having one terminal tube end as its lowermost extremity and the other side of said arch at its lower end merging through a reverse bend into a first longitudinal run, said first longitudinal run lying in the plane of said arch and terminating at its opposite end in a return bent arch lying in the plane of said first arch and having a second longitudinal run, said opposite end being welded in coaxial end relation to an end of a second length of tubing bent downwardly and forwardly, then upwardly and forwardly at a point longitudinally spaced from said welded ends to form a depressed longitudinal run closely paralleling said first longitudinal run, said second length of tubing having a forwardly extending terminal end superposingly fixedly connected with the crown of said first arch so that said first longitudinal run and said depressed longitudinal run cooperate to form a mounting plate for suspending one end of a propulsion means and defining with the crown of said first arch a self-reinforcing frame section wherein said one terminal tube end provides support for a steerable axle mount, said first arch and said second longitudinal run respectively from front and rear seat supports, and the rearmost portion of said first longitudinal run forms a rear axle assembly support.

References Cited in the file of this patent

UNITED STATES PATENTS

| | | |
|---|---|---|
| 382,351 | Cherry | May 8, 1888 |
| 1,309,331 | Nelson | July 8, 1919 |
| 1,311,223 | Giacoletto | July 29, 1919 |
| 1,354,141 | Sleffel | Sept. 28, 1920 |
| 2,593,347 | Roe et al. | Apr. 15, 1952 |
| 2,660,448 | Douglas et al. | Nov. 24, 1953 |
| 2,789,831 | Verik | Apr. 23, 1957 |

UNITED STATES PATENT OFFICE
CERTIFICATE OF CORRECTION

Patent No. 3,017,198 January 16, 1962

Isadore Horowitz

It is hereby certified that error appears in the above numbered patent requiring correction and that the said Letters Patent should read as corrected below.

Column 2, line 65, after "lower" insert -- frame --; column 4, line 9, for "horizontal" read -- horizontally --; column 7, line 69, for "vertical" read -- vertically --; column 10, line 49, for "of", second occurrence, read -- a --.

Signed and sealed this 21st day of August 1962.

(SEAL)
Attest:
ESTON G. JOHNSON

Attesting Officer

DAVID L. LADD
Commissioner of Patents